J. FOUNTAIN, Jr.
COMBINATION PULL SLEEVE, PIPE OR CABLE SUPPORT OR CONNECTOR.
APPLICATION FILED MAY 29, 1907.
954,081.
Patented Apr. 5, 1910.
2 SHEETS—SHEET 1.
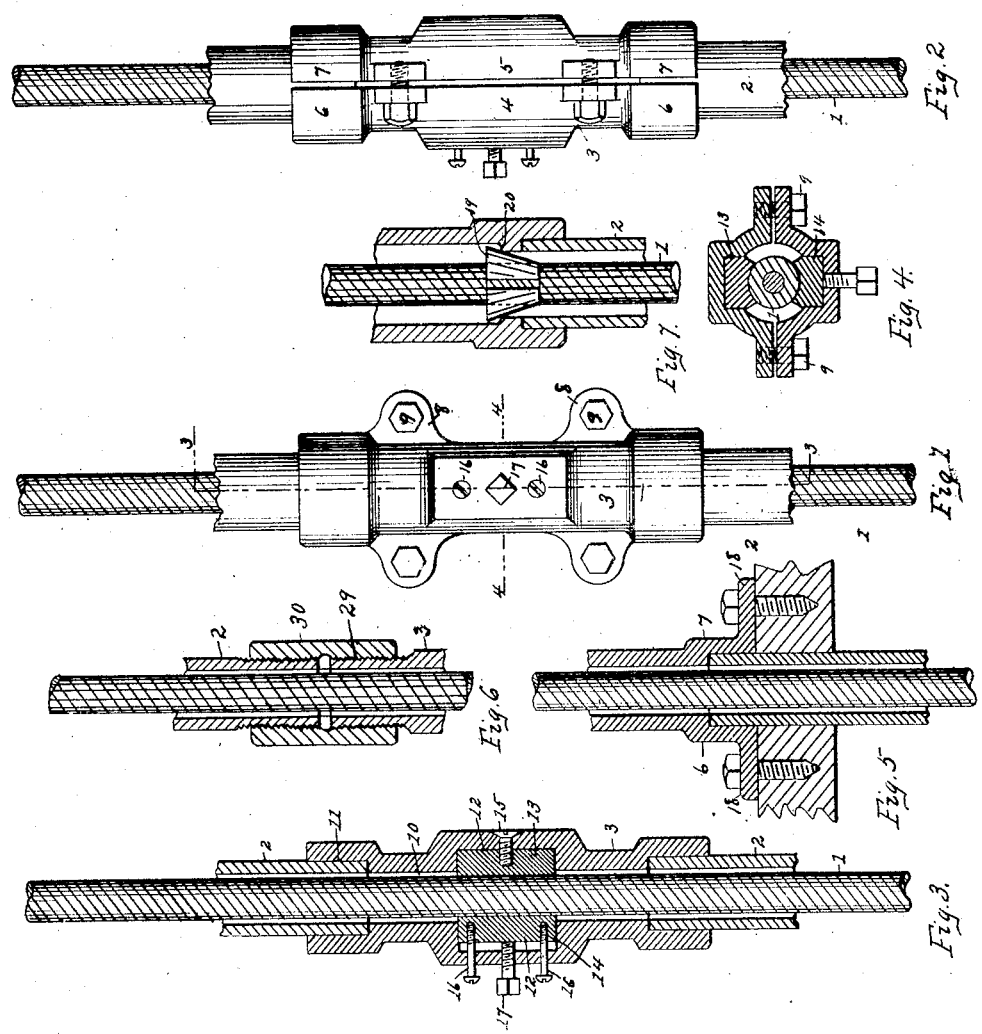
WITNESSES:
Albert Dick
C. A. Alliston
INVENTOR
John Fountain Jr.
BY
Fischer & Sanders
ATTORNEY

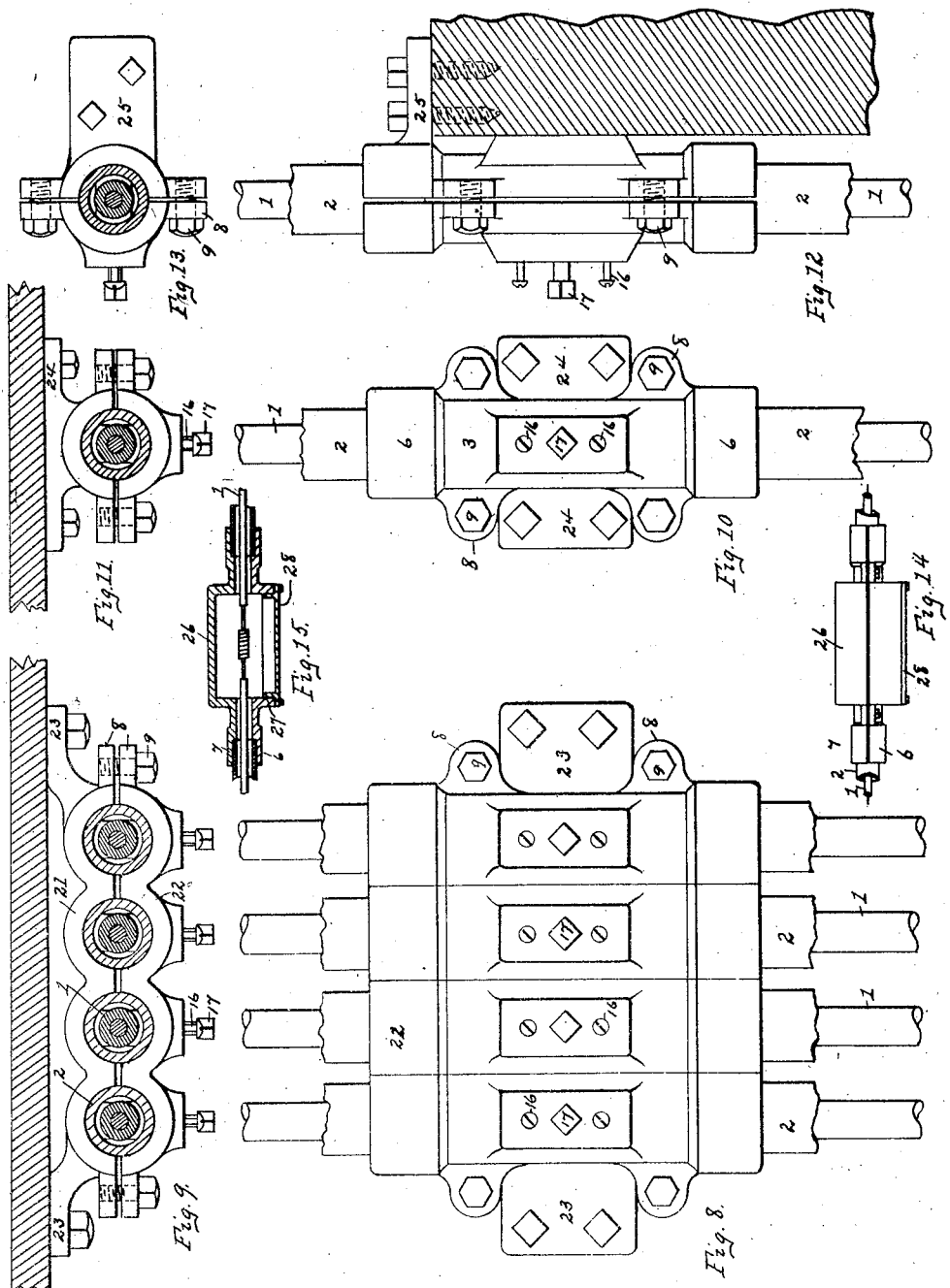

UNITED STATES PATENT OFFICE.

JOHN FOUNTAIN, JR., OF ELIZABETH, NEW JERSEY.

COMBINATION PULL-SLEEVE, PIPE OR CABLE SUPPORT OR CONNECTOR.

954,081.   Specification of Letters Patent.   Patented Apr. 5, 1910.

Application filed May 29, 1907. Serial No. 376,265.

*To all whom it may concern:*

Be it known that I, JOHN FOUNTAIN, Jr., a citizen of the United States, residing at Elizabeth, in the county of Union and State of New Jersey, have invented certain new and useful Improvements in Combination Pull-Sleeves, Pipe or Cable Supports or Connectors; and I do hereby declare the following to be a full, clear, and exact description of my invention, such as will enable others skilled in the art to which it appertains to make, construct, and use the same.

In electrical wiring of large buildings, for lighting or power purposes, it is becoming the universal custom to provide heavy trunk cables, running usually from the bottom of the building to the top, such cables being ordinarily located in the elevator shaft, or in some cases, in a separate shaft, especially designed for the purpose. The great length of such cables, coupled with their enormous size and their weight, make it necessary that they should be supported from the walls of the shaft in which they are located at frequent intervals, in order to preserve such cables from abrasion, due to their swaying and also to assist in supporting the same, to prevent their parting. Again, it frequently occurs in the wiring of such buildings, that long stretches of wire are required to run horizontally through protecting tubes, located in or against the walls of the building for the purpose, such tubes being located before the wiring is done. Under such circumstances, it is a difficult matter to carry the wire through such long stretches of tube and I make use of the structure hereinafter described, as what has come to be known in the art as a "pull sleeve" and pipe connector, the device being located in the junction of two stretches of pipe, which pipe for the purpose has been cut into shorter lengths than the entire length. In this manner, the wire or cable may be inserted in one end of the tube and carried to the next junction where it may be grasped and pulled through and then inserted into the next succeeding stretch of pipe and carried therethrough, and so on until the entire wiring is thus completed. To close the gaps between the adjacent ends of such pipe, I may use the device, coupling the same to the ends of the pipe, so as to make the same practically continuous.

In some cases, it is required to lead off circuits from the wires inclosed in the pipe or conduit, and I find it convenient to provide one side of the device with an opening provided with a removable cover, as hereinafter fully described.

My invention has for its purpose, the provision of suitable means for accomplishing these and other objects, which will be fully set out in the following specification.

In the accompanying drawings, Figure 1 illustrates a front plan of my improvements in position for supporting the cable. Fig. 2 is a side view of the same. Fig. 3 is a section on line 3—3 of Fig. 1. Fig. 4 is a cross-section on line 4—4 of Fig 1. Fig. 5 is a vertical section through a modified form, where the same is supported upon a floor or other horizontal surface. Fig. 6 is a vertical section through a modified form of coupling device. Fig. 7 is a section of a modified form of cable support. Fig. 8 is a front plan, and Fig. 9 is a top plan of a gang of supports integrally connected together. Fig. 10 is a front plan, and Fig. 11 is a top plan illustrating a modified form of attaching means. Figs. 12 and 13 also illustrate a further modified form of attaching means. Fig. 14 illustrates the application of my improvement as a pull sleeve in a horizontal stretch of cable or wire, and Fig. 15 is a longitudinal section of the same.

Similar numerals of reference refer to like parts throughout the specification and drawings.

The National Board of Fire Underwriters require that all electric cables shall be suitably protected by inclosing them in tubes, as well as supporting said cables at intervals, where such cables are suspended vertically.

In Fig. 1, I show a plan view of my invention, in which 1 represents the cable, 2 the inclosing pipe, and 3 the coupling or support. This coupling or support is composed of the two sections 4 and 5, provided with the enlarged end thimbles 6 and 7. The two sections are also provided with laterally projecting apertured lugs 8, with the screw bolts 9 for securing the two sections 4 and 5 together. When so coupled together the two parts form a tubular structure, with the central aperture 10 extending longitudinally through the same. The enlarged end thimbles 6 and 7 have enlarged internal diameters 11 for the reception of the adjacent ends of the pipe sections 2, as shown.

In each half section located about midway of the length thereof, is the recess 12. In these recesses are secured the two blocks 13 and 14 of fiber, wood or other insulating friction material. The piece of such material 13 may be rigidly secured in the recess 12 by any desired means, as for example, the screw 15 passing from the outer wall of the recess into the body of such material. If desired, it may be held in by friction with the walls of said recess, under which conditions it will be forced into the recess by heavy pressure. The part 14 located in the recess 12 is capable of adjustment and may slide in and out of the recess, being guided by the two guide screws 16, and held in fixed adjustment by means of the bolt 17 screwed to the outer wall of the recess, and impinging upon the back of the friction material 14. When in use, the cable 1 is strung through the series of pipes 2, which are of sufficient length to comply with the requirements of each case, with a pair of the sections 4 and 5 located between adjacent ends of such tube, as shown, and when in such position, the clamping of the friction material 13 and 14 by means of the screw bolt 17 will serve to relieve the cable of excessive strain, while at the same time the thimbles 6 and 7 serve as a convenient coupling means for connecting the adjacent ends of the protective pipe together. Under some conditions, it is unnecessary to give the coupling any additional support than that afforded by the metal pipes 2, which standing vertical and resting upon some suitable support in the lower part of the building, are held from lateral movement by a series of staples (not shown), at suitable intervals.

Where it is desired to afford support for cables which pass directly through the floors of the building, I may provide the thimbles 6 and 7 with the flanges 18 resting directly upon such floor and bolted thereto as shown. The other parts, however, of the coupling will be substantially the same as illustrated in Figs. 1, 2 and 3. As illustrated in Fig. 3, the ends of the pipe 2 are simply inserted in the enlarged thimbles 6 and 7 and held in position by means of the grip of the two sections upon the ends of such pipes, which is produced by screwing the sections 4 and 5 together by the bolts 9. However, if desired, the thimbles 6 and 7 on each end of the castings, may be omitted, and the ends threaded as at 29, Fig. 6. The ends of the pipe 2 may be also threaded and said pipe and the ends of the casting coupled together by means of a nipple 30, as is usually the custom in connecting adjacent ends of pipe.

As a modified means for supporting the cable within the coupling, I may provide the split conical thimble 19, clearly shown in Fig. 7, such thimble surrounding the cable 1, with its exterior conical surface bearing upon the shoulders 20 upon the interior of the enlarged coupling. Any downward tendency of the cable 1 will be arrested by the more firmly clamping together of the split thimble 19 upon its outer surface.

It frequently happens that electrical cables are assembled in gangs as illustrated in Fig. 8. Under these conditions, I may provide the two sections 21 and 22, such sections having the series of internal apertures as illustrated. The series of pipes 2 are held in position by clamping the same between the two sections 21 and 22, with the cables 1 inside the same. Either the supporting means comprising the friction material illustrated in Fig. 3, or the split thimble 19 of Fig. 7 may be used in the gang coupling illustrated in Figs. 8 and 9. If desired, the legs 23 may be cast upon one of the sections as 21, as a means for securing the same to the side wall of the shaft in which the cables are located.

If desired, the section 5 as illustrated in Fig. 2, may be provided with the feet 24 as a means for attaching a single coupling to a wall, or under some circumstances, where the support or coupling comes adjacent to the top of a wall or beam, a single leg 25, as illustrated in Fig. 12 may be used.

I do not limit myself to the exact means of supporting the coupling from any adjacent fixed structure, and other forms of support will occur to persons skilled in the art of electric wiring, without further mention of the same here.

As heretofore set forth, I may use the structure as a pull sleeve, locating the same between the adjacent ends of two horizontal sections of pipe, or tubing through which the cable is carried. In this case, inasmuch as the tube 2 is otherwise supported, it is unnecessary to provide any other flanges or feet, as illustrated in Figs. 8 to 13 inclusive, for the reason that the thimbles 6 and 7 are clamped directly to the adjacent ends of the pipe or conduit 2. In this case also, inasmuch as there is no strain upon the cable or wire, I may omit the clamping devices, heretofore referred to.

In the last modification described, I may also provide one side of the enlarged portion 26 of the pull sleeve with an opening 27, using the cover 28 to close such opening when all of the parts are secured in position. In this case, if it becomes necessary to lead out lateral circuits from the main wire or cable 1, this may be readily done by removing the cover 28 and permitting such lateral circuits to lead from the main wire or cable 1 through the opening 27. Any suitable electric fixture may be substituted for the cover 28.

I claim:

1. A new article of manufacture, comprising a pair of mating sections, means for securing said sections together, adjustable clamping means carried by said sections for gripping a cable within said coupling or support and a supporting bracket integral with one of said sections.

2. A new article of manufacture, comprising a tubular casing, means at the ends of said casing for securing the adjacent ends of alined pipes therein, adjustable means within said casing for frictionally securing an electric or other cable therein and a supporting bracket integral with one of said sections.

3. A new article of manufacture, comprising a pair of mating sections, means for securing said sections together to form a tubular casing, adjustable clamping means within said casing for gripping and holding a cable against longitudinal displacement and a supporting bracket integral with one of said sections.

4. A cable support or connector, comprising a pair of mating sections forming a tubular casing, means for securing said sections together, each section being provided with a recess upon its inner side, a block of insulating friction material in each of said recesses, means for drawing said blocks toward each other to grip and hold a cable passing through said casing and a supporting bracket integral with one of said sections.

This specification signed and witnessed this 27th day of May 1907.

JOHN FOUNTAIN, Jr.

Witnesses:
    Louis M. Sanders,
    C. A. Alliston.